United States Patent
Gouirand

[15] 3,692,325
[45] Sept. 19, 1972

[54] AIR SUSPENSION WITH SADDLE MEMBERS

[72] Inventor: Rene Gouirand, New York, N.Y.

[73] Assignee: Joseph Mercadante, Greenwich, Conn.

[22] Filed: March 22, 1971

[21] Appl. No.: 126,793

[52] U.S. Cl............280/104.5 A, 280/124 F, 293/68, 105/199
[51] Int. Cl..............................................B60g 5/02
[58] Field of Search...280/104.5 A, 104.5 R; 293/68; 105/199 R

[56] References Cited

UNITED STATES PATENTS

| | | | |
|---|---|---|---|
| 2,838,321 | 6/1958 | Gouirand | 280/104.5 R |
| 2,624,594 | 1/1953 | Gouirand | 280/104.5 R |
| 2,906,358 | 9/1959 | Tucker | 280/104.5 A |
| 2,493,004 | 1/1950 | Mackie | 280/104.5 A |

*Primary Examiner*—Philip Goodman
*Attorney*—F. Eugene Davis, III, Robert H. Ware and Mattern, Ware & Davis

[57] ABSTRACT

A vehicle air suspension system having an air bag located between upper and lower plate-like members further includes a pair of saddle members coupled to the vehicle adjacent each side of the air bag and fixed relative to the upper plate-like member. Each saddle member has a substantially vertically oriented slot-like opening therein through which a pivot shaft extends in the transverse direction of the vehicle. The pivot shaft is fixedly connected to the lower plate-like member and is slidably engaged in the slot-like openings of the saddle for movement in the vertical direction. Rocker arms are rotatably coupled adjacent the ends of the pivot shaft and vehicle wheels are coupled to the ends of the rocker arms. The saddle members substantially restrain the pivot shaft against movement in the longitudinal or lateral direction of the vehicle.

27 Claims, 9 Drawing Figures

AIR SUSPENSION WITH SADDLE MEMBERS

This invention relates to vehicle air suspension systems, and more particularly to air suspension systems which are particularly suitable for use with trucks, buses, railroad cars, and other heavy duty use.

Most known air suspension systems of the type to which the present invention pertains incorporate one or more of the following undesirable characteristics: they are relatively complicated in construction, require a relatively large number of parts, require the use of a sway bar and generally, require frequent and periodic lubrication of their various moving parts to assure proper operation and to improve the life expectancy of the suspension system.

The main object of the present invention is to provide improved air suspension systems which overcome the above disadvantages of the prior art and which utilize a reduced number of parts, which require little or no periodic lubrication and which do not require the use of a sway bar and its associated suspension components.

A further object of the present invention is to provide a "floating" action air suspension system which is self aligning and in which metal fatigue is reduced.

SUMMARY OF THE INVENTION:

In accordance with the present invention, the air suspension system includes a first plate-like member which supports an air bag from above and a plate-like suspension member bearing against the lower surface of the air bag. A pivot shaft extending transverse of the vehicle is fixedly mounted to the suspension member which bears against the lower surface of the air bag. Rocker arms are rotatably coupled at each end of the pivot shaft and vehicle wheels are rotatably mounted to the extension arms of the rocker arms for rotation. Chassis saddle members each with a vertically oriented slot-like opening are fixed relative to the first plate-like member at each side of the air bag. The pivot shaft is slidably engaged in the openings of the chassis saddle members for movement in the vertical direction, the chassis saddle members substantially restraining said pivot shaft against movement in the longitudinal or lateral direction of the vehicle.

In accordance with a further aspect of this invention, safety air-bumpers are provided which are in air-communication with the air in the suspension system air bag. The air in the air bumpers acts as an additional air reservoir for the air bags of the suspension system to effectively softened the resulting ride of the vehicle and to enhance the performance of the suspension system. Additionally, the air bumper absorbs vehicle impacts and the air in the suspension system enhances the impact absorption characteristics of the air bumper.

Figure 9:
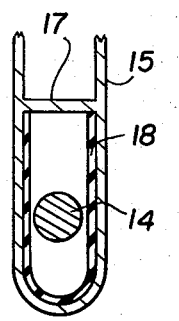
Figure 8:
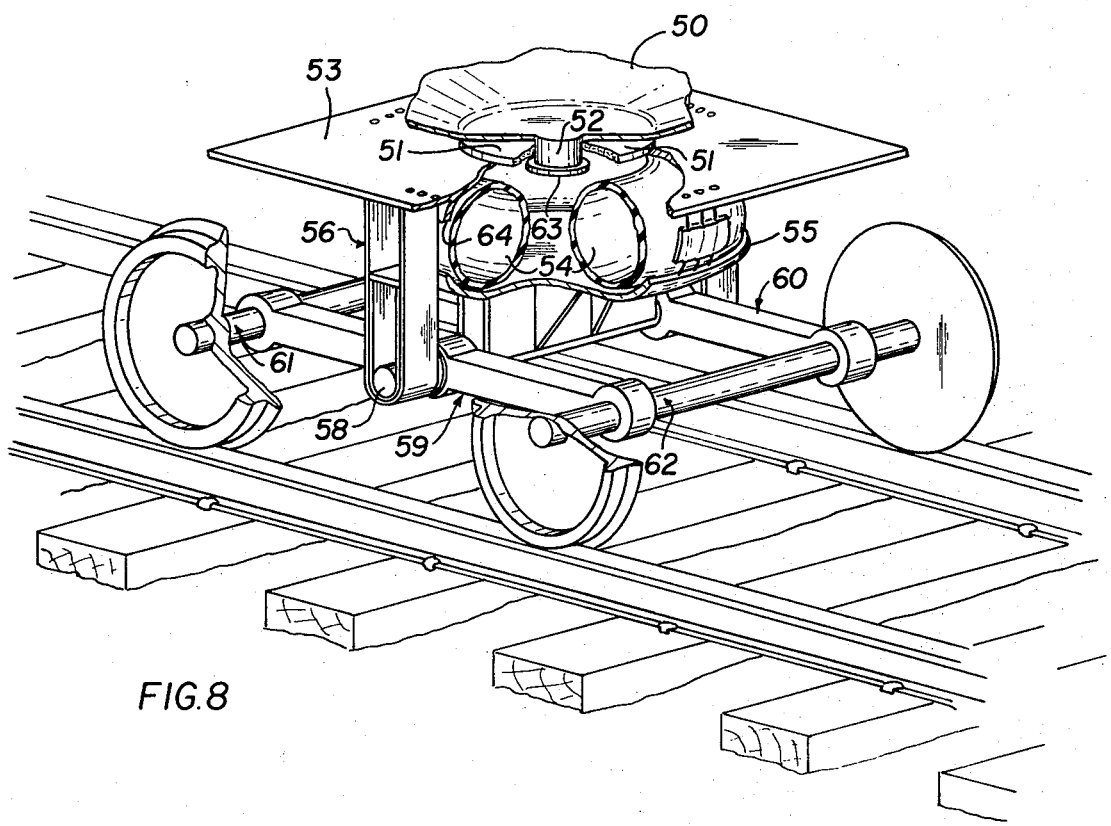

FIG. 8 generally illustrates an embodiment of the present invention for use in railroad cars, and FIG. 9 is a fragmentary cross-sectional view of a modification of the embodiment shown in FIGS. 1–5.

DETAILED DESCRIPTION OF THE DRAWINGS:

Referring to FIGS. 1–5, there is shown a first embodiment of the present invention. A plate-like member 1 is secured, for example by welding, to channel-shaped chassis members 2 and 3. The upper surface of an air bag 4 bears against plate 1. Air bag 4 may be connected to plate 1 by means of bolts (not shown), by bonding, or the like.

A lower plate-like member 6 is provided which bears upon the lower surface of the air bag 4. Bolts 7 (FIG. 2), for example, couple the air bag 4 to lower plate-like member 6. Alternatively, bonding or the like may be used. The exact location of the bolts 7 may be different than as shown. The closer to the center of the air bag 4 that the bolts are located, the softer will be the ride of the vehicle since a larger portion of the air bag 4 will be allowed to flex in the radial direction thereof. Air bag 4 is preferably coupled to plate 1 in a similar manner.

Secured to the lower plate-like member 6 are reinforcing members 8, 9, 10 and 11, which are shown running in the lengthwise direction of the vehicle. Reinforcing members 8–11 are secured, for example by welding, to plate 6. Reinforcing members 8–11 are also preferably welded to transverse support members 12 and 13 which are also secured, for example by welding, to plate 6. A pivot shaft 14 which runs in the transverse direction of the vehicle is secured, preferably by welding, to transverse support members 12 and 13. Saddle members 15 and 16 are fixedly secured respectively to either side of the chassis members 2 and 3 of the vehicle at the upper portions thereof as clearly seen in FIGS. 1 and 2. Saddle members 15 and 16 are identical and only saddle member 15 will be discussed in detail herein.

Figure 1:
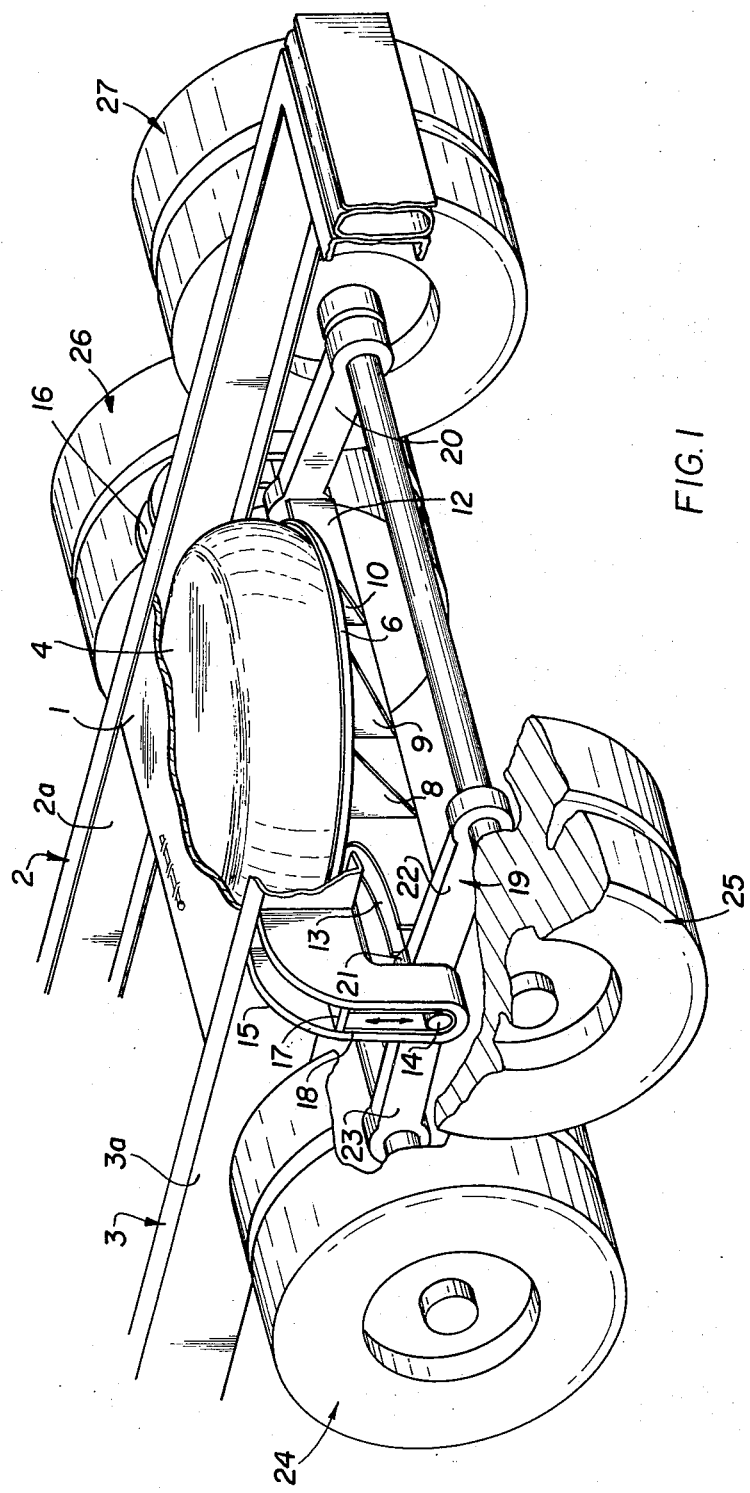
FIG. 1 is a perspective view of an embodiment of the present invention for use as the rear suspension of a truck.
Figure 2:
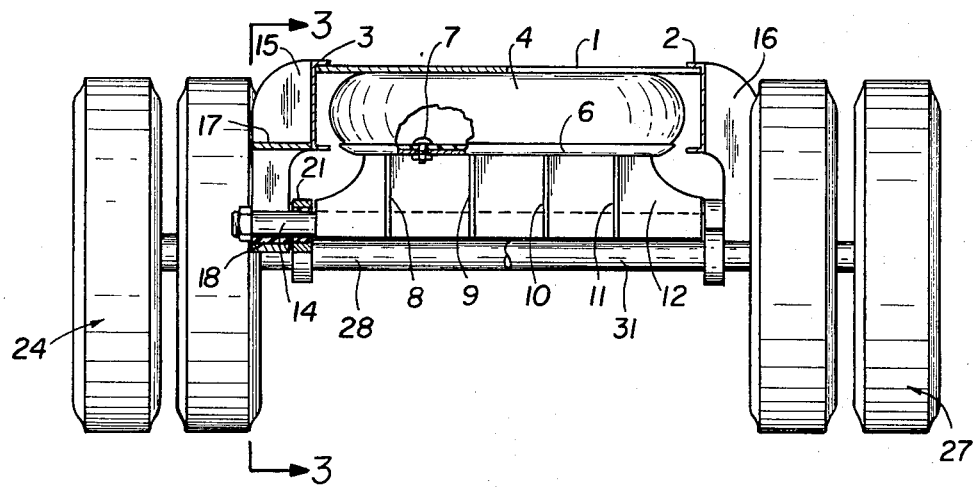
FIG. 2 is a rear elevation view, shown partly in section, of the embodiment of FIG. 1, as taken on line 2—2 in FIG. 4.
Figure 3:
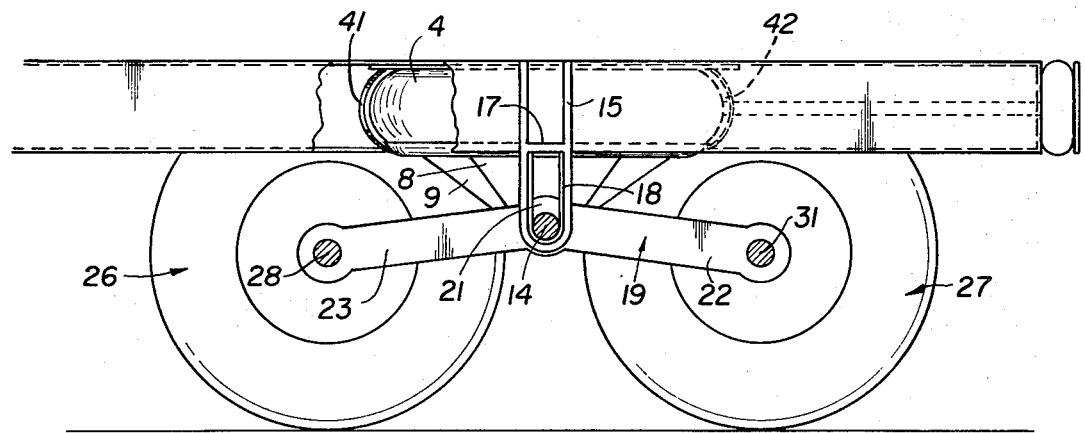
FIG. 3 is a side elevation view of the embodiment of FIG. 1, as taken on line 3—3 in FIG. 2.
Figure 4:
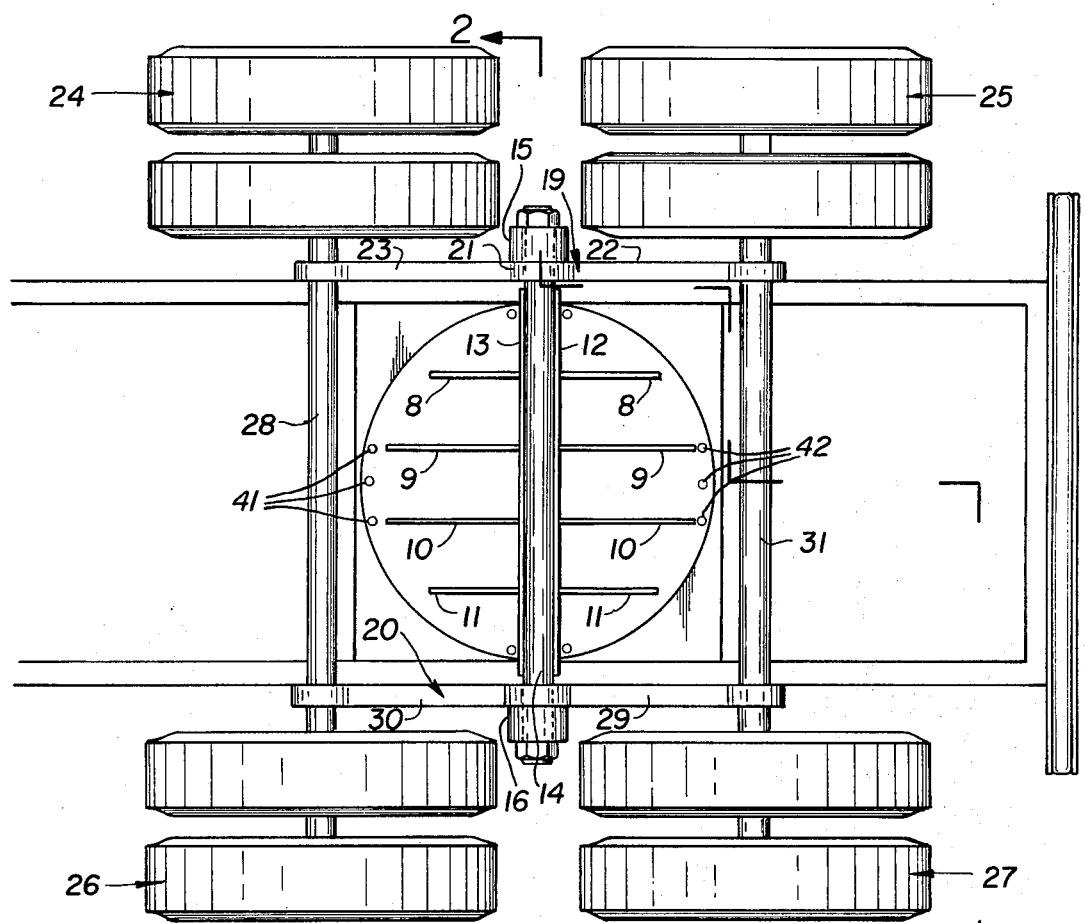
FIG. 4 is a bottom view of the embodiment of FIG. 1.

The saddle member 15 is generally U-shaped as most clearly seen in FIGS. 1, 3 and 4. The curved outline of saddle 15, as seen in FIG. 2, is shown only by way of example and is not limiting. Any other suitable outline (or shape) which provides the desired structural strength in a particular application can be used. A reinforcing plate 17 is incorporated in the saddle to increase the strength thereof. The inner surface of the lower U-shaped portion of saddle member 15 is lined with rubber 18, or the like, and the pivot shaft 14 is adapted to slide in the vertical direction in the slot-type journal formed by the rubber lined portion of the saddle 15. The specific manner in which the various components are secured together is shown in greater detail in FIG. 4 and will be discussed hereinbelow.

Interposed between the ends of the transverse support members 12 and 13 and the saddles 15 and 16 are respective rocker arms 19 and 20. Rocker arms 19 and 20 are identical and only arm 19 will be described. Rocker arm 19 comprises a portion 21 having a rubber-lined 36 journal therein (see FIG. 5) in which the pivot shaft 14 is rotatably engaged. The rubber lining (bushing) 36 in portion 21 acts as a bearing and slightly resilient support structure for the pivot shaft 14. Rocker arm 19 further includes extension arms 22 and 23 extending from the rubber lined journaled portion 21, vehicle wheels 24 and 25, respectively, being rotatably mounted to the remote ends of extension arms 22 and 23. Likewise, wheels 26 and 27 are rotatably mounted to the remote ends of extension arms 29 and 30, respectively, of rocker arm 20.

Wheels 24 and 26 are rotatably coupled to an axle 28 which is coupled to the remote ends of extension arms 23 and 30 of rocker arms 19 and 20. Similarly axle 31 couples wheels 25 and 27 to remote ends 22 and 29 of rocker arms 19 and 20.

Figure 5:
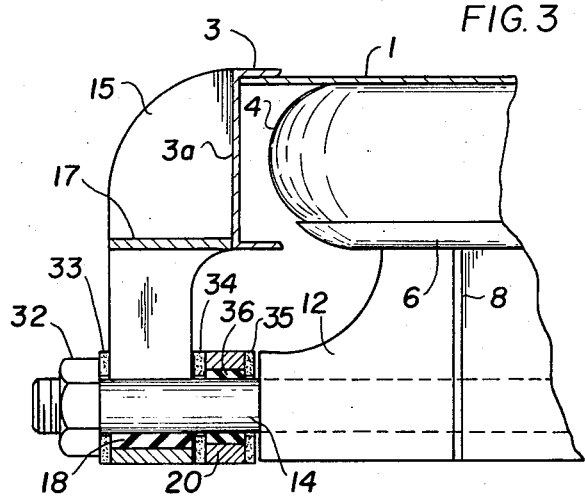
FIG. 5 is an enlarged view of the saddle portion as shown in FIG. 2, shows the construction in more detail.

Referring to FIG. 5, the end of the pivot shaft 14 is threaded and a retaining nut 32 is threadably engaged therewith. A fiber washer 33, or the like, is interposed between the surface of the nut 32 and the adjacent outer surface of the saddle 15. Likewise fiber washers 34 and 35 are interposed respectively between the rocker arm 20 and the inner surface of saddle 16 and the outer surface of reinforcing member 12. The purpose of washers 33 and 34 is to prevent heat build-up and wear due to friction when the pivot shaft 14 moves up and down relative to the saddle 16 during vehicle movement and when the rocker arms rotate relative to the reinforcing members 12 and 13. At the other end of the pivot shaft, that is, on the side of chassis saddle 15, the construction is similar to the aforementioned, and is not described in detail. The washers 33–35 may be made of any suitable material such as brake lining material, etc.

The upper plate-like member 1 may be additionally resiliently connected to lower plate-like member 6 by means of flexible cable arrangements 41 and 42 which are coupled to plates 1 and 6. The cables 41 and 42 may be as shown and described in my co-pending application Ser. No. 110,704, filed Jan. 28, 1971. Each cable set 41 and 42 includes three individual cables. The manner in which cables 41 and 42 are preferably connected to plates 1 and 6 is shown in said copending application. The cables 41 and 42 are shown in FIG. 3 as spaced from the air bag 4. However, as the load is applied to the vehicle, they preferably bear against bag 4, depending upon load on the vehicle and on vehicle design. Cables 41 and 42 aid in retaining the plates 1 and 6 in their relative positions and aid in reducing the forces applied to saddle members 15 and 16. Cables 41 and 42 may also be arranged with the outer cables diverging from the central cable to aid in wheel alignment as described in said copending application.

The arrangement of FIGS. 1–5 illustrates the pivot shaft 14 resting against the lower surface of the rubber lined U-shaped portion of the saddle members 15 and 16 for ease of illustration. Under actual conditions, the pivot shaft 14 is spaced from the bottom of saddle members 15 and 16 to allow for rebounding conditions and to allow some free dropping space to enable suspension response to dropping road surface irregularities.

The operation of the suspension described with respect to FIGS. 1–5 is as follows. As the vehicle wheels hit a bump or irregularity in the road surface, a wheel raises, a rocker arm pivots, and thereby causes the pivot shaft 14 to move vertically upward in the rubber-lined journals of saddles 15 and/or 16. This causes the lower plate-like member 6 to accordingly rise up against the air bag 4 and causes the air bag 4 to flex due to the impact, thereby absorbing the shock. Since the pivot shaft 14 is slidable in the saddles 15 and 16, and since the rocker arms on which the vehicle wheels are mounted are rotatable relative to the pivot shaft 14, when one of the wheels of the vehicle hits a bump, the effects on the wheels at the other end of the particular rocker arm assembly and the effects on the wheels at the other side of the vehicle are reduced to a great degree. This greatly reduces wear on the tires and it has been found that heating up of the vehicle tires is greatly reduced. By virtue of the sidewalls 2a and 3a of the channel chassis members 2 and 3, respectively, which are preferably spaced from but adjacent to the sides of the air bag 4, sidesway forces are further reduced. There is no need for providing separate sway bars or the like. Except for the relative movement between the suspension parts which have fiber washers 33, 34 and 35 interposed therebetween, see FIG. 5, the suspension system has no moving parts which require lubrication. The life expectancy of the suspension system of the present invention is greatly improved.

Figure 6:
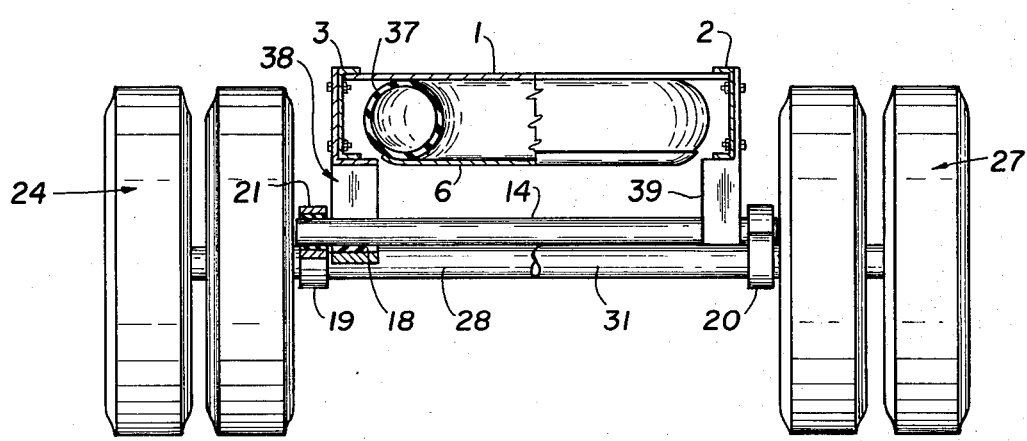
FIG. 6 is a view, similar to that of FIG. 2, but of another embodiment of the present invention.

FIG. 6 shows another embodiment of the present invention using a "donut" shaped air bag 37 mounted in a manner similar to the air bag 4 of FIGS. 1–5. Similar elements are given the same reference numerals and are not further discussed in detail. The exact mounting construction of the saddles, such as shown in FIG. 5, is not shown for the arrangement of FIG. 6. The specific mounting details should be apparent in view of the above description of FIGS. 1–5.

In FIG. 6 saddle members 38 and 39 have similar rubber lined U-shaped portions as do saddles 15 and 16. The saddles 38 and 39 are secured somewhat differently to chassis members 2 and 3 and are located inboard of rocker arms 19 and 20, whereas saddles 15 and 16 of FIGS. 1–5 are located outboard of rocker arms 19 and 20. This arrangement operates substantially the same as does the embodiment of FIGS. 1–5.

Figure 7:
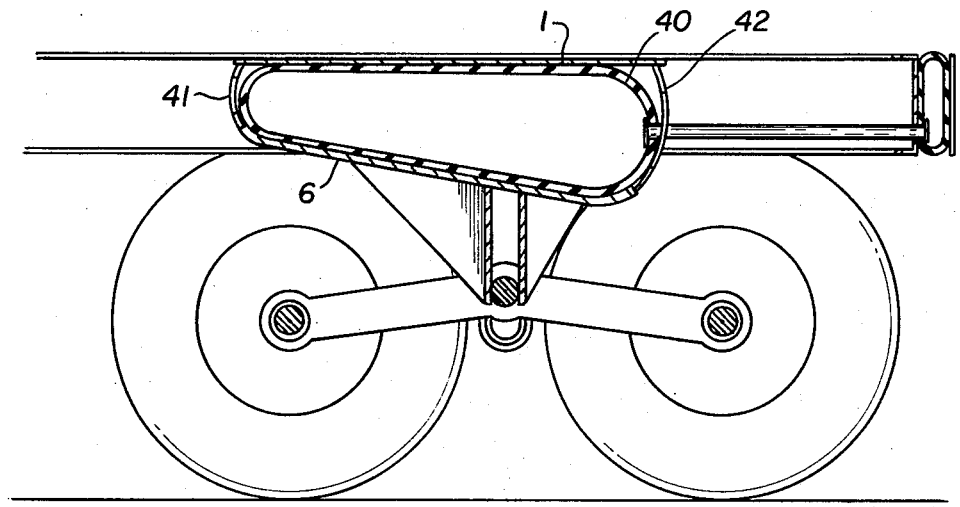
FIG. 7 is a view, similar to that of FIG. 3, but of still another embodiment of the present invention.

FIG. 7 shows another embodiment of the invention using an air bag 40 which is tapered in the longitudinal direction of the vehicle. The location of the saddles, which may be of the construction shown in FIGS. 1–5, that shown in FIG. 6, or the like, is rearward of the center of the air bag 40 and is in the vicinity of the larger portion of air bag 40. Cable arrangements 41 and 42 aid in securing the plate 6 to the upper plate 1 at the front and rear, respectively thereof. The air bag 40 may additionally be bolted, bonded, or the like to plates 1 and 6. The cables 41 and 42 may be as shown and described in my co-pending application Ser. No. 110,704, filed Jan. 28, 1971. Side cables are not necessary since the chassis side portions 2a and 3a are provided to bear side loads and the side saddle members prevent sideways movement.

This arrangement is more conservative of space below the chassis. The advantages of the tapered air bag 40 are discussed in said co-pending application Ser. No. 110,704.

FIG. 8 shows the application of the suspension system of the present invention to railroad car suspensions. This arrangement is superior to present-day suspension arrangements in that a better ride is achieved, the structure is lighter in weight, has substantially no moving parts which require periodic maintenance, and thereby has a longer useful life.

Referring to FIG. 8, a typical railroad car includes a member 50 with a bearing plate 51 thereon. Bearing plate 51 is preferably made of a material such as brake-lining material, or the like. If necessary, a bearing plate, similar to plate 51, can be provided on the upper surface of plate 53. Extending from railroad car member 50 is a downwardly projecting pin member 52 which is received in the truck of the railroad car.

The truck configuration of the present invention includes an upper plate 53 which bears on the upper surface of a doughnut-shaped air bag 54. The lower surface of the air bag 54 rests on a plate-like member 55 which has its peripheral edges upwardly curved to conform to the shape of the air bag 54. The curved peripheral edges of the plate 55 help retain the plate 55 in position with respect to the air bag 54. A curved annular member 64 extends from the lower surface of upper plate 53 to aid in retaining the air bag 54 in position relative to plate 53. Ring 64 is optionally provided.

The air bag 54 may be coupled to the plates 53 and 55 by means of bolts, bonding or the like. Bolts, such as bolts 7 of FIG. 2, can be used. Rubber lined saddle members 56 and 57 (saddle member 57 is not shown) are secured to the upper plate 53, for example by welding, and a pivot shaft 58, which extends transverse of the vehicle, is slidable in the vertical direction in saddles 56 and 57. The remaining part of the structure, which comprises rocker arms 59 and 60, axles 61 and 62 and the railroad wheels, operate in a similar manner to the suspension system described with respect to FIGS. 1–5 herein. The operation of the embodiment of FIG. 8 should be apparent in view of the foregoing descriptions and a detailed discussion thereof is not included herein.

An opening is provided in the central portion of the upper plate 53 for receiving the downwardly projecting pin 52 of the railroad car. A retaining member 63, such as a nut, etc., is secured to the end of pin 52 after it is engaged in the upper plate 53 to retain the truck to the railroad car.

Flexible cables, such as cables 41 and 42 of FIGS. 1–5, are located at the front and rear portions of the air bag 54 in a manner similar to that shown in FIG. 3. Cables, such as cables 41 and 42, may be located at the sides of the air bag 54, as well as at the front and rear, to further improve rigidity of the overall arrangement.

The above described railroad car suspension is extremely advantageous from the point of view of smoothness of ride and also from the point of view of economy, both in fabrication and maintenance. The air bag 54 is coupled to an air supply (not shown) as is well known in the art. As the load on the railroad car increases, the air pressure in the air bag 54 can be likewise increased to bear same while still providing good shock absorption and riding characteristics.

FIG. 9 illustrates a modification of the saddle members used in the above described embodiment. In FIG. 9, elements corresponding to the elements shown in FIGS. 1–5 are given the same reference designations for ease of description.

In the embodiment of FIG. 9, the pivot shaft 14 is spaced on either side from the rubber lining 18 in the saddle member 15. It should be clear that saddle member 16 is of similar construction. The remainder of the vehicle suspension system is not shown in FIG. 9. In the embodiment of FIG. 9, the provision of the space on either side of the rubber lined side walls of the saddle member 15 aids in reducing wear on the rubber lining 18 and aids in reducing metal fatigue of the components of the suspension system. In practice, the air bag will at least partially dissipate the horizontal component of a shock applied to the suspension system when a wheel hits a bump or the like, so that when the pivot shaft 14 impacts the rubber lining 18, the impact force is reduced. This reduces wear on the rubber lining 18 and reduces metal fatigue in the saddles 15 and 16 and the associated components. In a typical embodiment, the spacing between the pivot shaft and the side walls of the saddle member would be approximately ¼ of an inch.

During normal riding of the vehicle, horizontal components of the road shocks applied to the vehicle tires are absorbed by means of the combination of the saddle, the cables and the air bag. However, during braking of the vehicle, most of the braking torque is absorbed by the saddle member.

The embodiment of FIG. 9 is particularly suitable for use in railroad cars wherein the vertical shocks applied to the suspension system are rather small in amplitude. The embodiment of FIG. 9 provides a greater degree of self alignment than the previously described embodiments wherein there is substantially no free space between the pivot shaft 14 and the rubber lined portion of the saddles.

A further modification of the present invention is to eliminate the axle shafts, for example axle shafts 28 and 31 of FIGS. 1–5, and to rotatably support each wheel structure only at the ends of its respective rocker arm. By virtue of this arrangement, an independent suspension system is obtained whereby the raising of one wheel due to vehicle impact does not affect the corresponding wheel on the opposite side of the vehicle as much as if a common axle shaft is provided. This type of construction may be preferable in certain applications.

A further modification to the present invention is to eliminate the rubber lining 18 and to provide the pivot shaft with a rubber bushing thereon. This type of construction provides substantially the same effects and the use of either one will depend upon the design requirements in particular applications.

The embodiments of FIGS. 1–9 thus provide a true "floating action" vehicle suspension system which is self aligning, which has a reduced number of moving parts, and in which metal fatigue is reduced. Further excessive sidesway is prevented without using additional sway bars, or the like.

The flexible cables may be replaced by other equivalent flexible elements and are shown only by way of example. In certain embodiments they may be eliminated, depending upon vehicle requirements and design.

The air suspension of the present invention is provided with an air supply means (not shown) the design of which is well known. As the load increases, the air pressure can be increased either manually or automatically.

A vehicle using the suspension systems of the present invention may be provided with an air bumper which is in air communication with the air bags. Such an arrangement is clearly shown, for example, in FIGS. 3 and 7. Such an air bumper is more fully described and shown in my co-pending applications Ser. Nos. 110,704 and 110,703, both filed Jan. 28, 1971. It should be clear that such air bumpers are also usable in air suspension systems other than those shown herein and in said co-pending applications. Such an air bumper enhances the performance of the suspension system and in turn, the suspension system enhances performance of the bumper, enabling the vehicle to safely withstand large shocks to the bumper with no substantial damage being incurred. Since shocks to the bumper are more efficiently cushioned, there is less danger to the occupants of the vehicle.

The term "air" is used in this specification and in the claims for convenience. It should be clear that any other suitable fluid medium, such as gases or liquids, may be used to practice the concepts of this invention disclosed and claimed in the appended claims.

It should be clear that many other variations and alterations can be made to the specific embodiments described above without departing from the present inventive concept as set forth in the accompanying claims.

I claim:

1. A vehicle suspension system comprising:
   a first upper plate-like member coupled to said vehicle;
   a second lower plate-like suspension member;
   an air bag located between said first and second plate-like members;
   first and second saddle members coupled to said vehicle adjacent each side of said air bag and fixed relative to said first plate-like member, each saddle member having a substantially vertically oriented slot-like opening therein;
   a pivot shaft extending transverse of said vehicle and fixedly coupled to said lower plate-like suspension member, said pivot shaft being slidably engaged in the slot-like openings of said saddle members for movement in the vertical direction, said saddle members substantially restraining said pivot shaft against movement in the longitudinal or lateral direction of the vehicle;
   first and second rocker arms rotatably coupled adjacent respective ends of said pivot shaft inboard of said saddle members; and
   vehicle wheels rotatably coupled to the ends of said rocker arms.

2. A suspension system according to claim 1 wherein the slot-like opening of each saddle member is a U-shaped opening.

3. A suspension system according to claim 1 wherein each saddle member includes a lining of rubber-like material in the respective slot-like opening.

4. A suspension system according to claim 1 including means for flexibly coupling together said first and second plate-like members at at least one of the front and rear portions of said air bag.

5. A suspension system according to claim 4 wherein said flexible coupling means couples together said first and second plate-like members at both the front and rear portions of said air bag.

6. A suspension system according to claim 5 wherein said flexible coupling means includes a flexible cable.

7. A suspension system according to claim 1 wherein said air bag is substantially round in the horizontal plane of the vehicle.

8. A suspension system according to claim 1 wherein said air bag is doughnut shaped.

9. A suspension system according to claim 1 wherein said air bag is secured to at least one of said first and second plate-like members.

10. A suspension system according to claim 1 wherein said first plate-like member is fixedly secured to a vehicle chassis and wherein said saddle members are fixedly secured to said vehicle chassis.

11. A suspension system according to claim 1 wherein said first and second saddle members are fixedly secured to said first plate-like member.

12. A suspension system according to claim 1 comprising a bearing member located between each respective rocker arm and saddle member.

13. A suspension system according to claim 1 wherein said rocker arms are coupled to said pivot shaft via respective rubber bearing members.

14. A suspension system according to claim 1 wherein said air bag has a tapered cross-section in the direction of the length of the vehicle.

15. A suspension system according to claim 14 comprising means flexibly coupling together said first and second plate-like members at at least the forward, narrowest cross-section, end of said tapered air bag.

16. A suspension system according to claim 1 wherein a space is provided between said pivot shaft and the side walls of said saddle members to allow relative movement between said pivot shaft and said saddle members in the longitudinal direction of said vehicle.

17. A suspension system according to claim 16 wherein said relative longitudinal movement is small in relation to the vertical movement between said pivot shaft and said saddle members.

18. A suspension system according to claim 1 wherein said vehicle is railroad car and wherein said first plate-like member is pivotally connected to said vehicle.

19. A suspension system according to claim 18 wherein said first plate-like member includes an opening and wherein said vehicle includes a downwardly extending pin to be received in said opening to pivotally couple said first plate-like member to said vehicle.

20. A suspension system according to claim 18 wherein said air bag is doughnut shaped.

21. A suspension system according to claim 18 wherein said saddle members are fixedly coupled to said first plate-like member.

22. A suspension system according to claim 1 wherein said system includes an air bumper comprising:
   a vehicle cross member located at an end of said vehicle;
   a bumper plate; and
   a bumper air bag in air-communication with said suspension system air bag and interposed between said vehicle cross member and said bumper plate.

23. A suspension system according to claim 22 wherein said bumper air bag is secured to both said vehicle cross member and to said bumper plate.

24. A vehicle suspension system comprising:

a first upper plate-like member coupled to said vehicle;

a second lower plate-like suspension member;

an air bag located between said first and second plate-like members;

first and second saddle members coupled to said vehicle adjacent each side of said air bag and fixed relative to said first plate-like member, each saddle member having a substantially vertically oriented slot-like opening therein;

a pivot shaft extending transverse of said vehicle and fixedly coupled to said lower plate-like suspension member, said pivot shaft being slidably engaged in the slot-like openings of said saddle members for movement in the vertical direction, said saddle members substantially restraining said pivot shaft against movement in the longitudinal or lateral direction of the vehicle; and a lining of rubber-like material between said saddle member and said pivot shaft.

25. A suspension system according to claim 24 wherein said lining is mounted to the inside surface of said slot-like opening in said saddle members.

26. A suspension system according to claim 24 wherein said lining is mounted to said pivot shaft in said slot-like opening.

27. A suspension system according to claim 24 wherein a space is provided between said pivot shaft and the side walls of said saddle members to allow relative movement between said pivot shaft and said saddle member in the longitudinal direction of said vehicle.

* * * * *